US010606756B2

(12) United States Patent
Sukhomlinov

(10) Patent No.: US 10,606,756 B2
(45) Date of Patent: Mar. 31, 2020

(54) IMPEDING MALICIOUS OBSERVATION OF CPU CACHE OPERATIONS

(71) Applicant: Intel Corporation, Santa Clara, CA (US)

(72) Inventor: Vadim Sukhomlinov, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/023,089

(22) Filed: Jun. 29, 2018

(65) Prior Publication Data

US 2019/0042447 A1 Feb. 7, 2019

(51) Int. Cl.
*G06F 12/08* (2016.01)
*G06F 12/0875* (2016.01)
*G06F 21/55* (2013.01)
*G06F 21/78* (2013.01)
*G06F 21/71* (2013.01)

(52) U.S. Cl.
CPC ........ *G06F 12/0875* (2013.01); *G06F 21/556* (2013.01); *G06F 21/71* (2013.01); *G06F 21/78* (2013.01); *G06F 2212/452* (2013.01)

(58) Field of Classification Search
CPC ............ G06F 12/0866; G06F 12/0802; G06F 12/0875; G06F 12/0897; G06F 21/55; G06F 21/556
See application file for complete search history.

(56) References Cited

U.S. PATENT DOCUMENTS

| 6,560,675 | B1 * | 5/2003 | Aho | G06F 12/0831 |
| | | | | 711/118 |
| 6,643,745 | B1 * | 11/2003 | Palanca | G06F 9/383 |
| | | | | 711/137 |
| 8,239,638 | B2 * | 8/2012 | Gunna | G06F 12/0833 |
| | | | | 710/39 |
| 8,261,023 | B2 * | 9/2012 | Yoshikawa | G06F 12/0859 |
| | | | | 711/131 |

(Continued)

OTHER PUBLICATIONS

Jingfei Kong—Architecting against Software Cache-based Side-Channel Attacks—IEEE—2013 (Year: 2013).*

(Continued)

*Primary Examiner* — Khoa D Doan
(74) *Attorney, Agent, or Firm* — Grossman, Tucker, Perreault & Pfleger, PLLC

(57) ABSTRACT

The present disclosure is directed to systems and methods for preventing or mitigating the effects of a cache-timing based side channel attack, such as a Meltdown type attack. In response to a speculatively executed data access by an unretired or incomplete instruction, rather than transferring data to the CPU cache, the data is instead transferred to data transfer buffer circuitry where the data is held in the form of a record until the instruction requesting the data is successfully completed or retired. Upon retirement of the instruction requesting the data access, the data included in the record may be transferred to the CPU cache. Each record held in the data transfer buffer circuitry may include: a data source identifier; a physical/virtual address of the data; a cache line that includes the data; and an instruction identifier associated with the instruction initiating the data access.

27 Claims, 6 Drawing Sheets

(56) References Cited

U.S. PATENT DOCUMENTS

| | | | | |
|---|---|---|---|---|
| 8,793,435 | B1* | 7/2014 | Ashcraft | G06F 12/10 |
| | | | | 711/118 |
| 8,909,967 | B1* | 12/2014 | van Dijk | G06F 12/1408 |
| | | | | 713/330 |
| 2004/0163080 | A1* | 8/2004 | Menon | G06F 8/66 |
| | | | | 717/168 |
| 2010/0088466 | A1* | 4/2010 | Nakanishi | G06F 3/0613 |
| | | | | 711/103 |
| 2012/0210066 | A1* | 8/2012 | Joshi | G06F 12/0866 |
| | | | | 711/118 |
| 2015/0117104 | A1* | 4/2015 | Senoo | G11C 7/1039 |
| | | | | 365/185.12 |
| 2016/0170889 | A1* | 6/2016 | Lee | G06F 12/0862 |
| | | | | 711/118 |
| 2017/0308306 | A1* | 10/2017 | Intrater | G06F 3/0611 |
| 2018/0357175 | A1* | 12/2018 | Jiang | G06F 12/1483 |
| 2019/0114422 | A1* | 4/2019 | Johnson | G06F 9/30043 |
| 2019/0138720 | A1* | 5/2019 | Grewal | G06F 21/556 |

OTHER PUBLICATIONS

Donghyuk Lee, Lavanya Subramanian, Rachata Ausavarungnirun, Jongmoo Choi, Onur Mutlu, Decoupled Direct Memory Access: Isolating CPU and IO Traffic by Leveraging a Dual-Data-Port DRAM. 2015 International Conference on Parallel Architecture and Compilation. (Year: 2015).*

Lipp, Mortiz, et. al., Meltdown, date unknown, 16 pages.

* cited by examiner

IMPEDING MALICIOUS OBSERVATION OF CPU CACHE OPERATIONS

TECHNICAL FIELD

The present disclosure relates to computer security, specifically detection and/or prevention of side-channel attacks.

BACKGROUND

Side-channel attacks gained widespread notoriety in early 2018. A side-channel attack includes any attack based on information gained from the implementation of a computer system, rather than weaknesses in the implemented algorithm itself. Such side-channel attacks may use timing information, power consumption, electromagnetic leaks or even sound as an extra source of information, that is exploited to obtain information and/or data from the system. Side-channel attacks include Spectre and Meltdown, both of which rely on deducing whether data originates in a cached or un-cached location. To a significant degree, the determination of where data originates relies upon the precise timing of events such as loads from memory space.

Modern operating systems map the kernel into the address space of every process executed by the processor. Access to the kernel space is restricted using a supervisor bit of the processor that is set to permit kernel access to the kernel space and is reset to block or prohibit user access to the kernel space. Meltdown overcomes this memory isolation, thereby permitting the user process to read the entire kernel memory of the machine executing the user process. Meltdown relies upon out-of-order execution to obtain data from the kernel space. CPUs supporting out-of-order execution support running operations speculatively to the extent that processor's out-of-order logic processes instructions before the CPU is certain whether the instruction is valid and committed. Meltdown reads information from the protected kernel space by causing the processor to execute multiple instructions such as:

```
data=getByte(kernelAddress)
variable=probeArray(data)
```

The "getByte" instruction will ultimately fail because of the prohibited read of kernel memory. However, the simultaneous access of an element in "probeArray" will pull the data from "probeArray" into cache. By timing reads at addresses from 0 to 255 in cache, the attacker is able to deduce the content of "kernelAddress."

For example, after flushing the cache, the Meltdown attacker retrieves a value "01000000" (binary "64") from a first address in the kernel memory. Prior to the processor generating an exception to the unauthorized read from kernel memory, the attacker uses retrieved kernel data as an index to access element "64" in a known array located in user space. The processor retrieves the value of array element 64 and loads the value into cache. The attacker then attempts to read every element from the array—access times for elements 0-63 and 65-255 will be relatively long as the data is retrieved from main memory. However the access time for element 64 will be considerably shorter as the data need only be retrieved from the cache. From this the attacker can deduce the data the first address in kernel memory is "0100000". By performing the action for every location in kernel memory, the attacker is able to read the contents of the kernel memory.

A first class of Spectre attacks takes advantage of branch target misprediction by a CPU to read data from memory into cache. Upon detecting the misprediction, the CPU clears the data from the pipeline, but the data read into cache remains. A covert side-channel may then be used to obtain the residual data from the cache. In this class of attack, the attacker trains the branch predictor in a system to take a particular branch. For example, using the following instructions, an attacker may train the system by providing values for "x" that are consistently smaller than the size of "array1." The attacker thus trains the system to speculatively execute the subsequent instruction based on the assumption that the branch has been historically true:

```
if ( x < array1.size( )) {
    int value = array2[array1[x] * 256] // branch 1
}
```

After training the system, the attacker sets the cache to a known state and provides a value of "x" that exceeds the size of "array1." Having been previously trained that "x" is typically less than the size of "array1," the processor executes the branch instruction (prior to the processor throwing the exception due to "x" being greater than the size of "array1") and uses the value found at address "x" as an index to look up the value at address "x" in array2. The processor loads the value at address "x" in array2 into cache. The attacker then reads all of the values of array2 and is able to determine the value of "x" as the address in array2 having the shortest access time.

For example, assume array1 has 256 elements addressed "0" to "255." The attacker provides values of "x" between 0 and 255 to train the system that the branch instruction is routinely executed. The attacker then sets the cache to a known state and provides a value of 512 for "x" (i.e., a value greater than 255). The value "01000000" (i.e., "64") at memory location 512 is read. The processor then looks up the value of array2 at address 64*256 and loads the value into cache. The attacker then examines the read time for each element in array2, the read time for element at address 64*256 will be less than the read time for the other array2 addresses, providing the attacker the information that the address at memory location 512 is "01000000" or "64." By performing the action for every memory location, the attacker is able to read the contents of the memory byte-by-byte.

A second class of Spectre attacks exploits indirect branching by poisoning the Branch Target Buffer (BTB) such that a CPU speculatively executes a gadget that causes the CPU to read data from memory into cache. Upon detecting the incorrect branching, the CPU clears the data from the pipeline but, once again, the data read into cache remains. A covert side-channel may then be used to obtain the residual data from the cache. In this class of attack, the attacker poisons the BTB of the victim system by repeatedly performing indirect branches to a virtual address in the victim's system that contains the gadget. For example, an attacker may control the content of two registers (R1, R2) in the victim's system at the time an indirect branch occurs. The attacker must find a gadget in the victim's system that, upon speculative execution by the victim's CPU, leaks data from selected memory locations in the victim's system. The gadget may be formed by two instructions, the first of which contains an instruction that mathematically and/or logically (add, subtract, XOR, etc.) combines the contents of register R1 with another register in the victim's system and stores the result in R2. The second instruction reads the contents of register R2, storing the value in R2 in cache.

For example, the attacker may control two registers in the victim system, ebx (R1) and edi (R2). The attacker then finds two instructions on the victim's system, such as:

```
adc     edi,dword ptr [ebx+edx+13BE13BDh]
adc     dl,byte ptr [edi]
```

By selecting ebx=m−0x13BE13BD−edx the attacker is able to read the victim's memory at address "m." The result is then added to the value in edi (R2). The second instruction in the gadget causes a read of R2 which contains the sum of "m" plus the attacker's value initially loaded into edi, transferring the value into the cache. By detecting the location of R2 within the cache using a side-channel timing attack, the attacker is able to determine the value of "in."

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
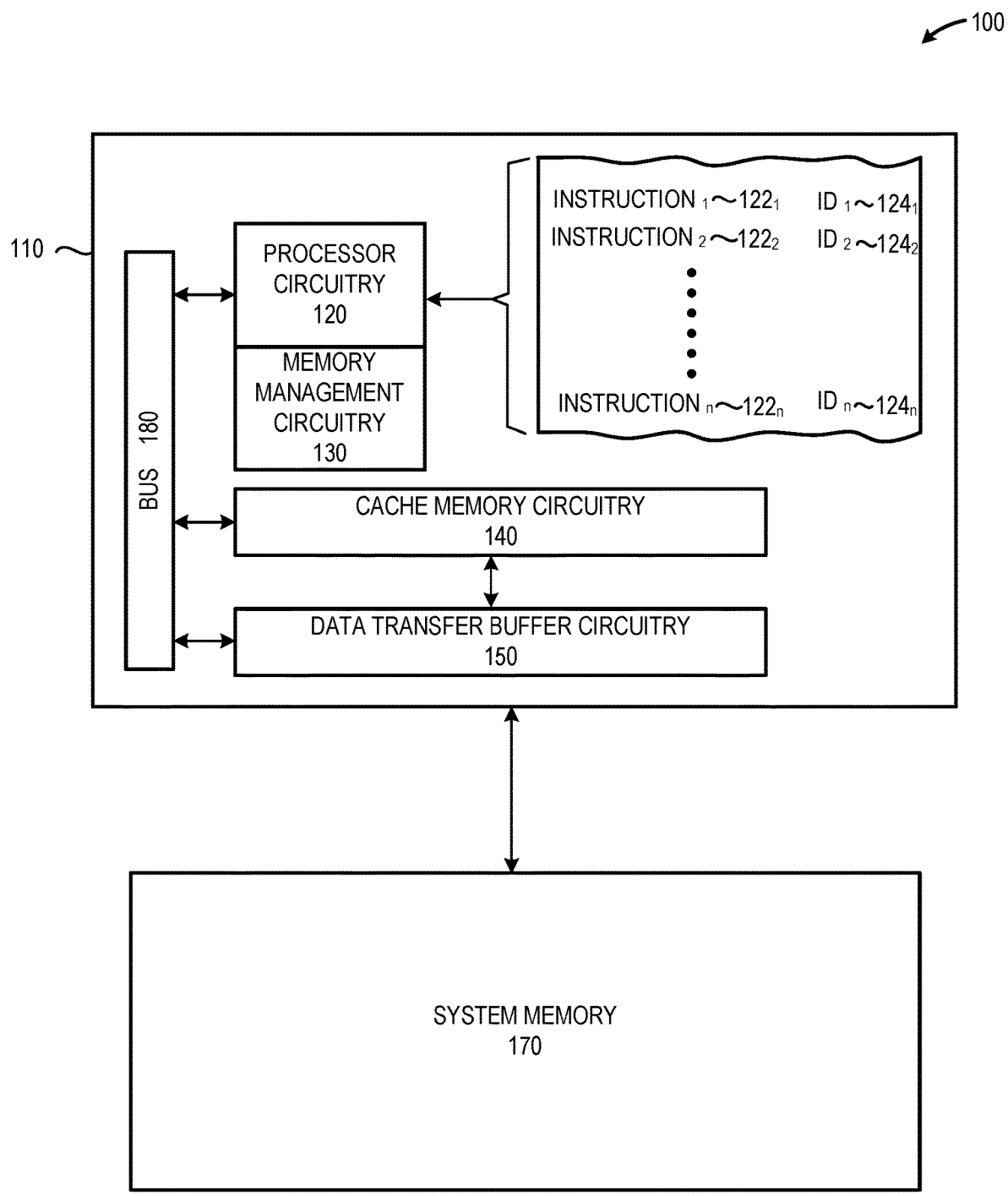
FIG. 1 provides a high level block diagram of an illustrative system that includes a central processing unit (CPU) having processor circuitry, memory management circuitry, cache circuitry, and data transfer buffer circuitry, in accordance with at least one embodiment described herein.

Although the following Detailed Description will proceed with reference being made to illustrative embodiments, many alternatives, modifications and variations thereof will be apparent to those skilled in the art.

DETAILED DESCRIPTION

Speculative execution beneficially increases the speed of a system by allowing the processor to execute instructions independent of data and/or input/output (I/O) access. With speculative execution, a high percentage of the executed instructions will be needed by an application executed by the processor. Upon successful execution and integration of the result of the instruction into the application flow, the processor then "retires" the instruction. The small portion of speculatively executed instructions that do not complete successfully and/or are not integrated into the application flow are not retired by the processor and thus remain in an "unretired" state.

Speculatively executed instructions may cause a change in cache state (i.e., may cause a cache write operation as a result of a data move or similar instruction) regardless of whether the instruction completes successfully and is "retired" or fails to complete successfully and remains "unretired." It is the existence of this vestigial data in the cache that serves as the target for side-channel attacks such as Spectre and Meltdown. During a Spectre or Meltdown attack, the processor executes one or more impermissible instructions that ultimately cause an exception—ordinarily, such instructions may cause a data transfer to the cache, however the instruction itself would remain "unretired" and the process flow proceeds without incident. However, Spectre and Meltdown take advantage of the data transferred to the cache during the pendency of the instruction execution (i.e., before the processor is able to generate an exception). By determining the location of the data transferred into cache, Spectre and Meltdown are able to infer information about the data itself. When performed repeatedly, Spectre and Meltdown are able to read large portions of system memory, including reserved and/or protected memory space that may contain secrets such as passwords, account information, and similar.

The systems and methods described herein prevent a Meltdown side-channel attack by forming a new memory structure in which data transferred by an unretired instruction is held in an "unretired cache" memory space. Upon successful execution and retirement of the instruction causing the data transfer, the data is forwarded from the unretired cache to processor cache. By preventing the direct transfer of data from main memory to the processor cache and instead temporarily transferring data from main memory to the unretired cache, the Meltdown attack is unable to use the processor cache to infer information about the transferred data. Beneficially, impermissible instructions, such as those executed during a Meltdown attack, will remain unretired and any data transferred from main memory to the unretired cache caused by the execution of impermissible instructions will remain in the unretired cache, never reaching the processor cache.

A system is provided. The system may include: processor circuitry. The processor circuitry may include cache circuitry and data transfer buffer circuitry coupled to the cache circuitry. The system may additionally include: memory controller circuitry and a storage device containing instructions that, when executed by the memory controller circuitry, cause the memory controller circuitry to: receive a request for data by an instruction executed by the processor circuitry: responsive to a determination that the requested data is not present in the cache circuitry, cause a transfer of the requested data from main memory to the data transfer buffer circuitry; and responsive to receipt of an indication of a successful execution of the instruction by the processor circuitry, transfer the requested data from the data transfer buffer circuitry to the cache circuitry.

A method is provided. The method may include: receiving, by memory controller circuitry, a request for data by an instruction executed by processor circuitry: determining, by the memory controller circuitry, whether the requested data is present in cache circuitry; causing a transfer of the requested data from main memory to data transfer buffer circuitry responsive to a determination that the requested data is not present in the cache circuitry; and causing a transfer of the requested data from the data transfer buffer circuitry to the cache circuitry responsive to receipt of an indication of a successful execution of the instruction by the processor circuitry.

A system is provided. The system may include: means for receiving a request for data by an instruction executed by processor circuitry; means for determining whether the requested data is present in cache circuitry; means for transferring the requested data from main memory to data transfer buffer circuitry responsive to a determination that the requested data is not present in the cache circuitry; and means for transferring the requested data from the data transfer buffer circuitry to the cache circuitry responsive to receipt of an indication of a successful execution of the instruction by the processor circuitry.

A non-transitory machine-readable storage medium is provided. The non-transitory machine-readable storage medium may include instructions that, when executed by memory controller circuitry, cause the memory controller circuitry to: receive a request for data by an instruction executed by processor circuitry: determine whether the requested data is present in cache circuitry; cause a transfer of the requested data from main memory to the data transfer buffer circuitry responsive to a determination that the requested data is not present in the cache circuitry; and cause a transfer of the requested data from the data transfer buffer circuitry to the cache circuitry responsive to receipt of an indication of a successful execution of the instruction by the processor circuitry.

An electronic device is provided. The electronic device may include: a printed circuit board; processor circuitry coupled to the printed circuit board, the processor circuitry including: cache circuitry and data transfer buffer circuitry coupled to the cache circuitry; memory controller circuitry; main memory; and a storage device containing instructions that, when executed by the memory controller circuitry, cause the memory controller circuitry to: receive a request for data by an instruction executed by the processor circuitry: determine whether the requested data is present in the cache circuitry; responsive to a determination that the requested data is not present in the cache circuitry, cause a transfer of the requested data from main memory to the data transfer buffer circuitry; and responsive to receipt of an indication of a successful execution of the instruction by the processor circuitry, transfer the requested data from the data transfer buffer circuitry to the cache circuitry.

As used herein, the term "processor cache" and "cache circuitry" refer to cache memory present within a processor or central processing unit (CPU) package. Such processor cache may variously be referred to, and should be considered to include, without limitation, Level 1 (L1) cache, Level 2 (L2) cache, Level 3 (L3) cache, and/or last or lowest level cache (LLC).

FIG. 1 provides a high level block diagram of an illustrative system 100 that includes a central processing unit (CPU) 110 having processor circuitry 120, memory management circuitry 130, cache circuitry 140, and data transfer buffer circuitry 150, in accordance with at least one embodiment described herein. The system 100 also includes a main system memory 170 coupled to the CPU 110. In embodiments, a data transfer structure 180, such as a bus may communicably couple some or all of the processor circuitry 120, memory management circuitry 130, cache circuitry 140, and data transfer buffer circuitry 150. The processor circuitry 120 executes a sequence of instructions 122A-122n (collectively, "instructions 122").

In some instances, the processor circuitry 120 may execute a first instruction 122A and may speculatively execute one or more instructions 122B-122n while the first instruction 122A resolves. In such instances, the speculatively executed instructions may cause one or more data transfer operations from main system memory 170 to the cache circuitry 140 in the CPU 110 during the pendency of the first instruction 122A. If the first instruction 122A is retired after successful execution, the data transferred to the cache circuitry 140 by the speculatively executed instructions 122B-122n provides a system performance advantage by beneficially speeding the execution of the instruction set. If, however, the first instruction 122A is not-retired due to an unsuccessful execution (e.g., causing an exception by performing a prohibited action), although not accessed by the application, the retrieved data remains in the cache circuitry 140. In such instances, a timing attack, such as a Meltdown attack, may infer information about the data transferred to the cache circuitry 140 even though the data remains unused until ultimately flushed from the cache circuitry 140.

As depicted in FIG. 1, when the processor circuitry 120 executes the first instruction 122A, and speculatively executes one or more subsequent instructions 122B-122n that cause a data access operation, rather than transferring the accessed data from main memory 170 directly to the cache circuitry 140, the memory management circuitry 130 instead causes the transfer of the data to one or more records in the data transfer buffer circuitry 150. The data transfer buffer circuitry 150 retains the record containing the accessed data until the one or more instructions 122 initiating the data access are successfully completes and/or is retired. Only upon successful completion and/or retirement of the one or more instructions 122 initiating the data access does the memory management circuitry 130 cause the transfer of the accessed data from the data transfer buffer circuitry 150 to the cache circuitry 140. Conversely, if the one or more instructions 122 initiating the data access fail to successfully complete and/or remain unretired, the memory management circuitry 130 does not cause the transfer of the accessed data from the data transfer buffer circuitry 150 to the cache circuitry 140, instead the data is retained in the data transfer buffer circuitry 150 until discarded, replaced, or overwritten. Advantageously, since the data retrieved from the main memory 170 transfers to the cache circuitry 140 only after successful completion/retirement of the one or more instructions 122 initiating the data access, a side-channel timing attack such as a Meltdown attack, is unable to infer information about the data by examining a side-channel such as CPU cache timing data.

The processor circuitry 120 may include any number and/or combination of electrical components, semiconductor devices, and/or logic elements capable of reading and executing machine-readable instruction sets. In embodiments, the processor circuitry 120 may include any number and/or combination of any currently available and/or future developed processors, microprocessors, controllers, and similar. In embodiments, the processor circuitry 120 may include circuitry capable of performing some or all of: fetching instructions 122, decoding the instructions 122, scheduling the instructions for execution, and executing some instructions while speculatively executing other instructions. In embodiments, the processor circuitry 120 may include one or more single- or multi-thread cores.

Example processor circuitry may include microprocessors such as Intel Pentium® microprocessor, Intel Core™ Duo processor, Intel Core i3, Intel Core i5, Intel Core i7, AMD Athlon™ processor, AMD Turion™ processor, AMD Sempron™, AMD Ryzen® processor, and ARM Cortex® processors.

The memory management circuitry 130 may be incorporated into the processor circuitry 120 or may be a stand-alone component. The memory management circuitry 130 monitors and/or controls all or a portion of the memory access, data transfer, and/or data transactions between the cache circuitry 140, data transfer buffer circuitry 150, and system memory 170. In embodiments, the memory management circuitry 130 may include any number and/or combination of electrical components, semiconductor devices, and/or logic elements capable of reading and executing machine-readable instruction sets. In embodiments, the memory management circuitry 130 may include one or more data stores, databases, and/or data structures useful in mapping virtual memory addresses to physical memory addresses (e.g., a translation lookaside buffer, page tables, or similar).

The cache circuitry 140 may include any number and/or combination of electrical components, semiconductor devices, and/or logic elements capable of non-persistently storing digital information and/or data. In embodiments, all or a portion of the cache circuitry 140 may be communicably coupled to a single processor circuit 120. In other embodiments, all or a portion of the cache circuitry 140 may be shared between multiple processor circuits 120A-120n. In embodiments, the cache circuitry 140 may store information and/or data as a cache line, such as a 64 bytes. In embodiments, if the data requested by the instruction 122 is located in the cache circuitry 140, the memory management circuitry 130 may copy the data from the cache circuitry to the data transfer buffer circuitry 150.

The data transfer buffer circuitry 150 may include any number and/or combination of electrical components, semiconductor devices, and/or logic elements capable of non-persistently storing digital information and/or data. In embodiments, the data transfer buffer circuitry 150 may include any number of records, each having a plurality of fields. In embodiments, the fields may include, but are not limited to one or more fields to store data representative of: the data received from the main memory 170; an identifier associated with the instruction 122 requesting the data from the main memory; an identifier associated with a location in the cache memory circuity where the data retrieved from the main memory 170 may be stored; and an identifier associated with the cache circuitry furthest from the processor circuitry 120 which does not contain the data transferred from the main memory 170 and may require updating. In embodiments, the data transfer buffer circuitry 150 may store or otherwise retain information and/or data in a cache line format (e.g., a 64 byte cache line) that can be transferred to the cache circuitry 150 upon retirement of the instruction 122.

The data transfer buffer circuitry 150 may receive information and/or data accessed by one or more instructions 122 executed by the processor circuitry 120. In embodiments, the memory management circuitry 130 may cause the transfer of information and/or data accessed by the one or more instructions 122 from main memory 170 to the data transfer buffer circuitry 150. The memory management circuitry 130 may cause the data transfer buffer circuitry 150 to retain the information and/or data accessed by the one or more instructions 122 during the pendency of the one or more instructions 122. In embodiments, the memory management circuitry 130 may cause the data transfer buffer circuitry 150 to transfer all or a portion of the data accessed by the one or more instructions 122 to the cache circuitry 140 upon receipt of information from the processor circuitry 120 indicative of a successful completion and/or retirement of the one or more instructions 122 initiating the data access request.

The main memory 170 may include any number and/or combination of any currently available and/or future developed electronic components, semiconductor devices, and/or logic elements capable of providing a persistent and/or non-persistent data and/or information storage device or system. The main memory 170 may include any number and/or combination of fixed and/or removable data storage devices. In embodiments, the main memory 170 may include all or a portion of the random access memory (RAM) allocated to operating system, application, and/or data storage. Example main memory components include, but are not limited to: static random access memory (SRAM); dynamic RAM (DRAM); synchronous dynamic RAM (SDRAM); single data rate synchronous dynamic RAM (SDR SDRAM); double data rate synchronous dynamic RAM (DDR SDRAM, DDR2, DDR3, DDR4); and similar. Data stored or otherwise retained in the main memory 170 is associated with a unique physical address. In embodiments, the memory management circuitry 130 may employ one or more data tables, databases, and/or data structures to map virtual addresses used by the instruction 122 to a physical address in the main memory 170.

Figure 2A:
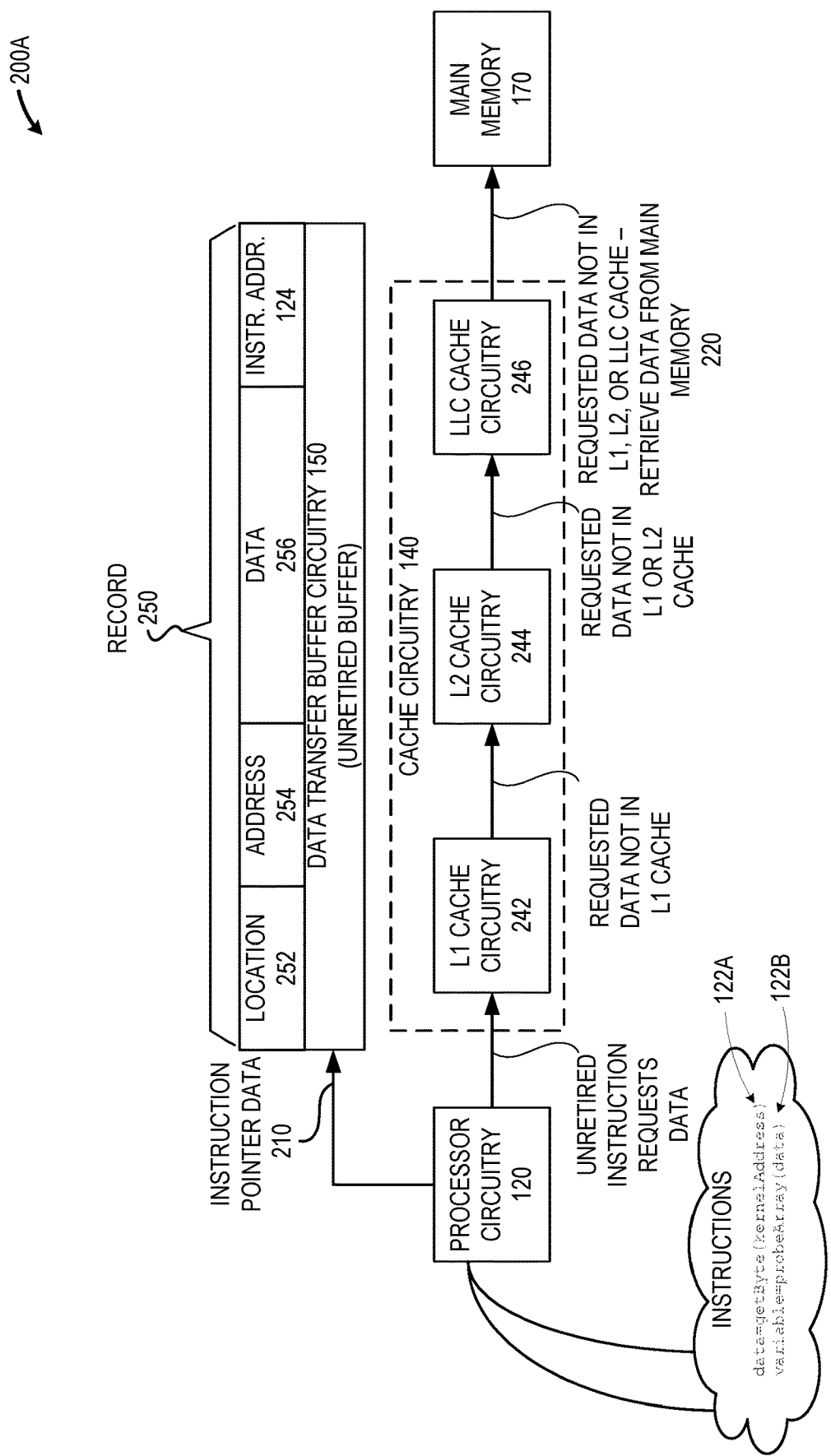
FIG. 2A is a block diagram of an illustrative system that includes processor circuitry executing an instruction that performs a data access, in accordance with at least one embodiment described herein.

FIG. 2A is a block diagram of an illustrative system 200 that include processor circuitry 120 executing an instruction 122 that performs a data access, in accordance with at least one embodiment described herein. In embodiments, the processor circuitry 120 may execute instructions 122 such as:

---
data=getByte(kernelAddress) 122A; and
variable=probeArray(data) 122B.
---

Each of instructions 122A-122n has a respective, logically associated, instruction identifier 124A-124n (e.g., an instruction pointer address or similar unique identifier) that enables the processor circuitry 120 to "reassemble" out of order speculatively executed instructions into the proper sequence. Typically, instructions 122A and 122B would result in a value included in "probeArray" at index "data" being loaded into cache circuitry 140. By timing the access to each element in "probeArray" the value for "data" may be determined.

As the processor circuitry 120 fetches, decodes, and executes instruction 122A the instruction identifier 124A (i.e., data indicative of the location of instruction 122A in the instruction pipeline of the application executed by processor circuitry 120) is provided 210 to the data transfer buffer circuitry 150. In a similar manner, as processor circuitry 120 speculatively fetches, decodes, and executes instruction 122B the instruction identifier 124B (i.e., data indicative of the location of instruction 122B in the instruction pipeline of the application executed by processor circuitry 120) is provided 210 to the data transfer buffer circuitry 150. The memory management circuitry 130 may store or otherwise retain the data accessed by the one or more instructions 122A-122n in the form of one or more records 250A-250n (collectively, "records 250") within the data transfer buffer circuitry 150.

Each of the records 250 within the data transfer buffer circuitry 150 may contain any number of fields having any field length to store information. For example, in one embodiment, each record 250 may include: a 2- to 8-bit location field 252 that includes data indicative of the origin location of the accessed data (e.g., L1 cache/L2 cache/LLC cache/external location; a 48- to 64-bit address field 254 that includes data indicative of the memory location (e.g., the physical and/or virtual address) of the accessed data; a 512 to 2096 bit data field 256 that includes the data accessed by the instruction 122; and an 8- to 64-bit instruction identifier 124 that includes an identifier of the instruction 122 that performed the access of the data 256 included in the respective record 250. The inclusion of a physical address in the record 250 may beneficially improve the handling of aliasing and shorten access latency of the memory management circuitry 130. The instruction identifier 124 may include a reference to at least one instruction in an instruction pipeline decoded and executed by the processor circuitry 120. Inclusion of the instruction identifier 124 in each record 250 permits the processor circuitry 130 to incorporate the data included in the data field 256 at the correct point in application execution.

As depicted in FIG. 2A, the processor circuitry 120 retrieves the data from the kernel memory location and uses the data as an index to read a value from "probeArray" prior to the permission check circuitry generating an exception. Since the cache circuitry 140 has been previously flushed, the value from "probeArray" is not found in any of the L1 cache 242, the L2 cache 244, or the LLC cache 246. Consequently, the value from "probeArray" is retrieved from main memory 170.

Figure 2B:
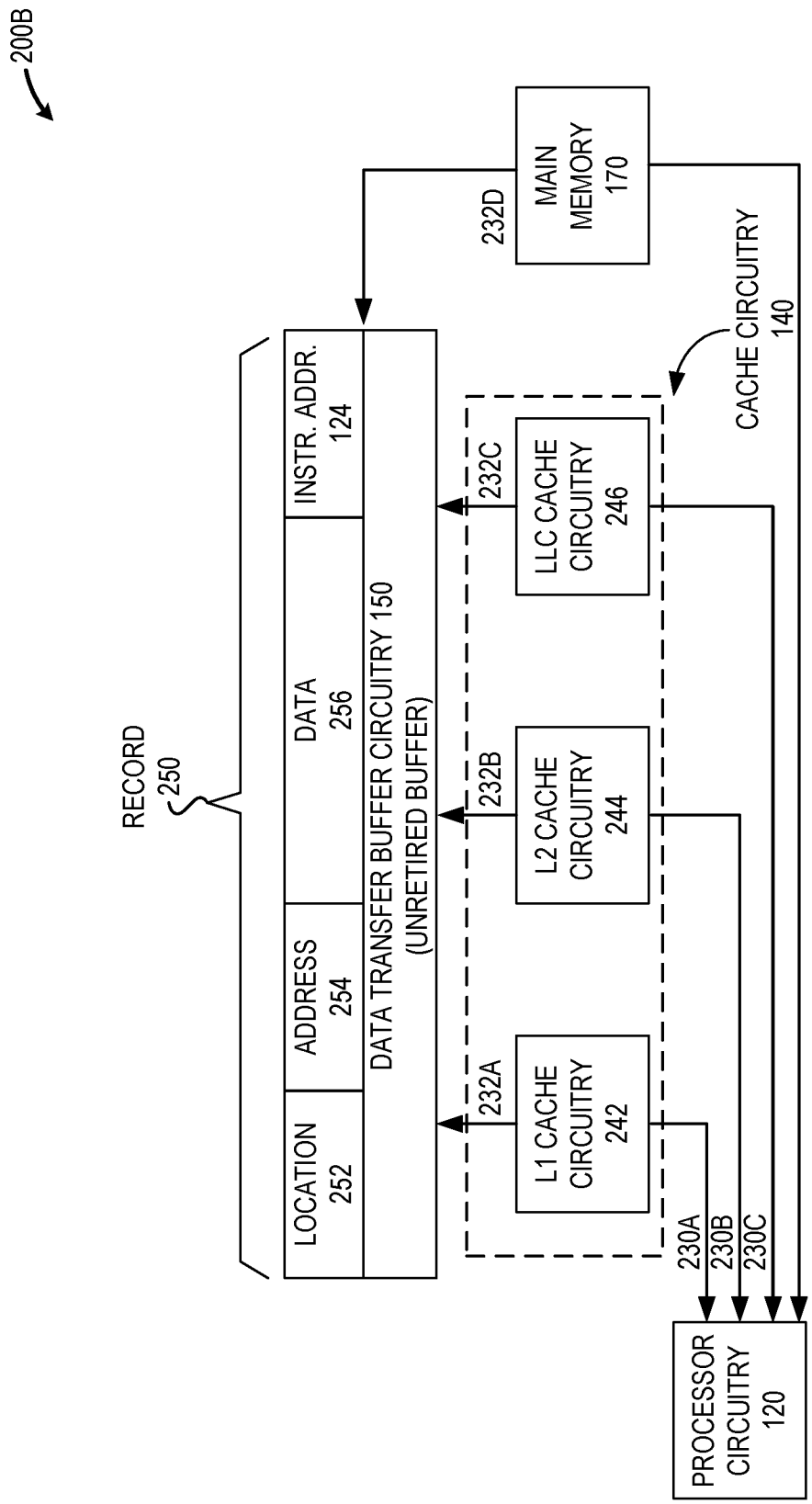
FIG. 2B is a block diagram of an illustrative system that includes processor circuitry performing a sequential data access that includes the L1 cache, L2 cache, and the last level cache (LLC) in response to executing the instruction of FIG. 2A, in accordance with at least one embodiment described herein.

FIG. 2B is a block diagram of an illustrative system 200 that include processor circuitry 120 executing an instruction 122 that performs a data access in which the data accessed by the instruction 122 is stored or otherwise retained in one or more locations within the cache memory circuit 140, in accordance with at least one embodiment described herein. In embodiments, the information and/or data transfers depicted in FIG. 2B may occur simultaneous with or in conjunction with some or all of the accesses described in detail above with regard to FIG. 2A, such embodiments should be considered within the scope of this disclosure. In embodiments, the processor circuitry 120 fetches, decodes, and executes an instruction 122 that accesses data previously loaded into one or more locations within the cache circuitry 140. Where the accessed data is resident in at least one of: the L1 cache, the L2 cache, the LLC cache, and/or memory, the respective cache or memory will transfer (230A, 230B, 230C, 230D respectively) the data to the processor circuitry 120. Additionally, where the accessed data is resident in at least one of the L1 cache, the L2 cache, the LLC cache, and/or memory the respective cache or memory will transfer the data (232A, 232B, 232C, 232D respectively) to the data transfer buffer circuitry 150. In some embodiments, if the accessed data is resident in the L1 cache 242, the data may not be transferred from the L1 cache 242 to the data transfer buffer circuitry 150. In embodiments, the memory management controller 130 may cause a transfer of a plurality of memory locations from the main memory 170 to each of a number of records 232D in the data transfer buffer circuitry 150. For example, the memory management circuitry 130 may cause the transfer of a 64 byte block memory equivalent to a cache line from the main memory 170 to an individual record 250 in the data transfer buffer circuitry 150.

Figure 2C:
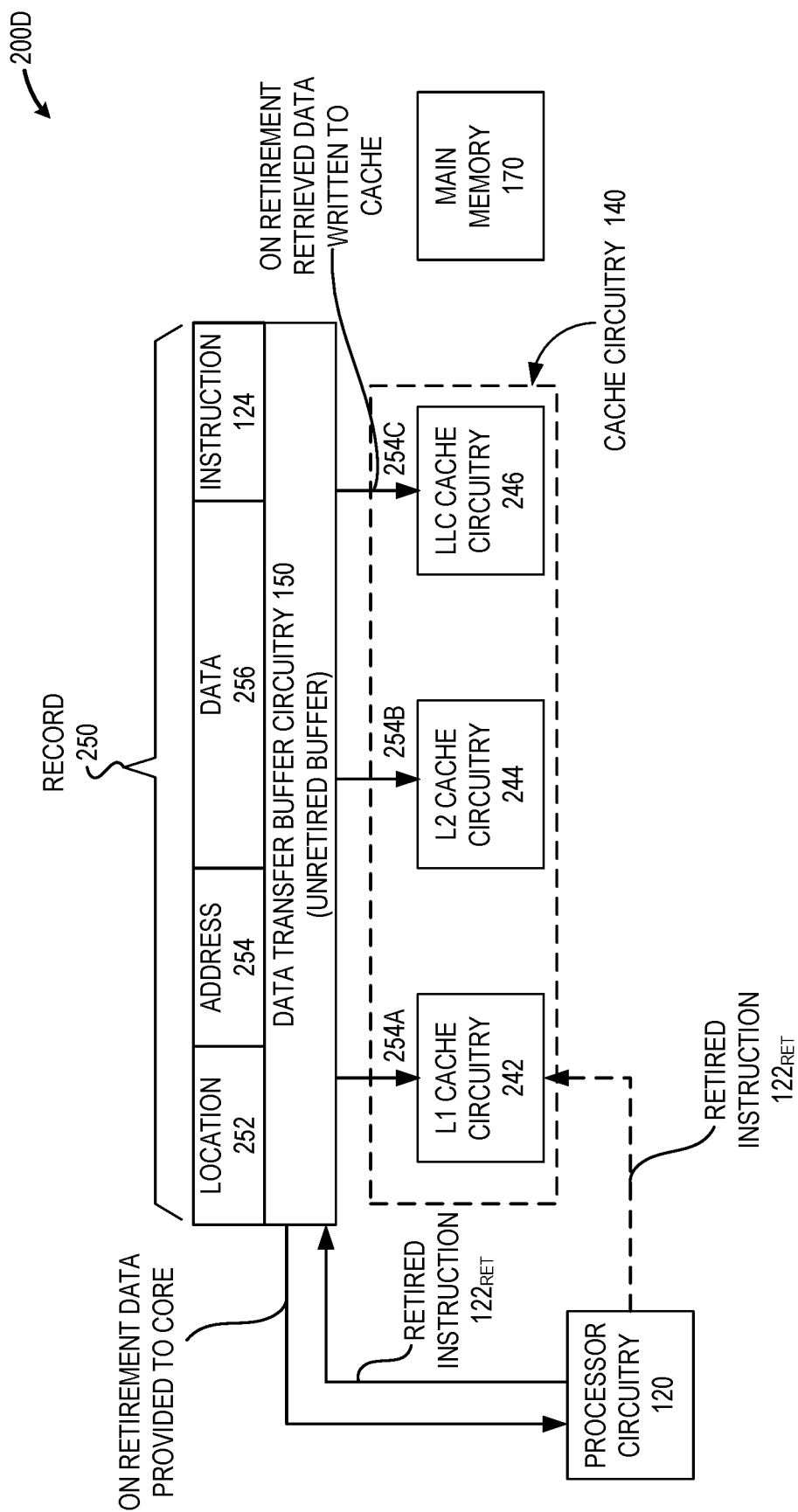
FIG. 2C is a block diagram of an illustrative system that in which the accessed data is provided to the processor circuitry and to the cache circuitry upon successful completion and/or retirement of the instruction performing the data access, in accordance with at least one embodiment described herein.

FIG. 2C is a block diagram of an illustrative system 200 that in which the accessed data is provided to the processor circuitry 120 and to the cache circuitry 140 upon successful completion and/or retirement of the instruction 122 performing the data access, in accordance with at least one embodiment described herein. In embodiments, upon successful completion and/or retirement of the instruction 122 causing the memory access, the processor circuitry 120 may communicate one or more commands indicative of the successfully completed and/or retired state of the instruction 122, such as a "RETIRED LOAD" command, to the L1 cache circuitry. In other embodiments, upon successful completion and/or retirement of the instruction 122 causing the memory access, the processor circuitry 120 may communicate one or more commands indicative of the successfully completed and/or retired state of the instruction 122, such as a "RETIRED LOAD" command, to both the L1 cache circuitry 242 and the data transfer buffer circuitry 150. In embodiments, the command communicated by the processor circuitry 120 to the L1 cache circuitry 242 and/or the data transfer buffer circuitry 150 may include information and/or data indicative of an instruction reference and/or instruction pointer address associated with the instruction 122. In embodiments, the command communicated by the processor circuitry 120 to the L1 cache circuitry 242 and/or the data transfer buffer circuitry 150 may include information and/or data indicative of the physical and/or virtual memory address of the data accessed by the instruction 122.

In some embodiments, the L1 cache circuitry 242 and/or the L2 cache circuitry 244 may pull the retrieved data from the data transfer buffer circuitry 150 upon successful completion and/or retirement of the instruction $122_{RET}$ causing the data access. In such instances, the command issued by the processor circuitry 120 responsive to the successful completion and/or retirement of the instruction $122_{RET}$ may include the virtual and/or physical address associated with the data and one or more references, such as an instruction pointer address, associated with the instruction 122 causing the data access. In such embodiments, the L1 cache circuitry 242 allocates space for the address and requests the data and memory location identified by the instruction reference from the unretired cache. Further, the L2 cache circuitry 244 may allocate space for an address and requests the data location identified by the instruction reference from unretired cache. In such embodiments, if the location of the data was in LLC circuitry 246, the L2 cache does not transfer the data to the L2 cache circuitry 244.

In other embodiments, the data transfer buffer circuitry 150 may push the retrieved data to the cache circuitry 140. Such a transfer may occur as a result of the processor circuitry 120 issuing a command to the data transfer buffer circuitry 150 that causes a push 254A, 254B, 254C of the retrieved data from the data transfer buffer circuitry 150 to one or more of: the L1 cache circuitry 242, the L2 cache circuitry 244, and/or the LLC cache circuitry 246, respectively. In such embodiments, the data transfer buffer circuitry 150 may use all or a portion of the information and/or data included in the location field 252 and/or the information and/or data included in the instruction address field 124 of the successfully completed and/or retired instruction $122_{RET}$. In such embodiments, the data transfer buffer circuitry 150 may use the information and/or data included in the location field 252 in the record identified by the instruction reference 124 to determine whether and/or where to push the retrieved data 256 associated with the retired instruction $122_{RET}$. When, for example, the information and/or data included in the location field 252 designates the location as the L1 cache circuitry 242, the data transfer buffer circuitry 150 may take no further action.

When the information and/or data included in the location field 252 designates the location as the L2 cache circuitry 244, the LLC cache memory 246 or the main memory 170, the data transfer buffer circuitry 150 may issue a "RETIRED PUSH" (or similar) instruction to the L1 cache circuitry 242. Such a "RETIRED PUSH" instruction includes information and/or data representative of the retrieved data 256 and information and/or data indicative of the physical and/or virtual address 254 associated with the retrieved data 256. Responsive to the receipt of the "RETIRED PUSH" command from the data transfer buffer circuitry 150, the L1 cache circuitry 242 may allocate a cache line for the specified physical and/or virtual address 254 and store the associated retrieved data 256.

When the information and/or data included in the location field 252 designates the location as the LLC cache memory 246 or the main memory 170, the data transfer buffer circuitry 150 may issue a "RETIRED PUSH" (or similar) instruction to the L2 cache circuitry 244. Such a "RETIRED PUSH" instruction includes information and/or data representative of the retrieved data 256 and information and/or data indicative of the physical and/or virtual address 254 associated with the retrieved data 256. Responsive to the receipt of the "RETIRED PUSH" command from the data transfer buffer circuitry 150, the L2 cache circuitry 244 may allocate a cache line for the specified physical and/or virtual address 254 and store the associated retrieved data 256.

When the information and/or data included in the location field 252 designates the location as the main memory 170, the data transfer buffer circuitry 150 may issue a "RETIRED PUSH" (or similar) instruction to the LLC cache circuitry 246. Such a "RETIRED PUSH" instruction includes information and/or data representative of the retrieved data 256 and information and/or data indicative of the physical and/or virtual address 254 associated with the retrieved data 256. Responsive to the receipt of the "RETIRED PUSH" command from the data transfer buffer circuitry 150, the LLC cache circuitry 246 may allocate a cache line for the specified physical and/or virtual address 254 and store the associated retrieved data 256.

Figure 3:
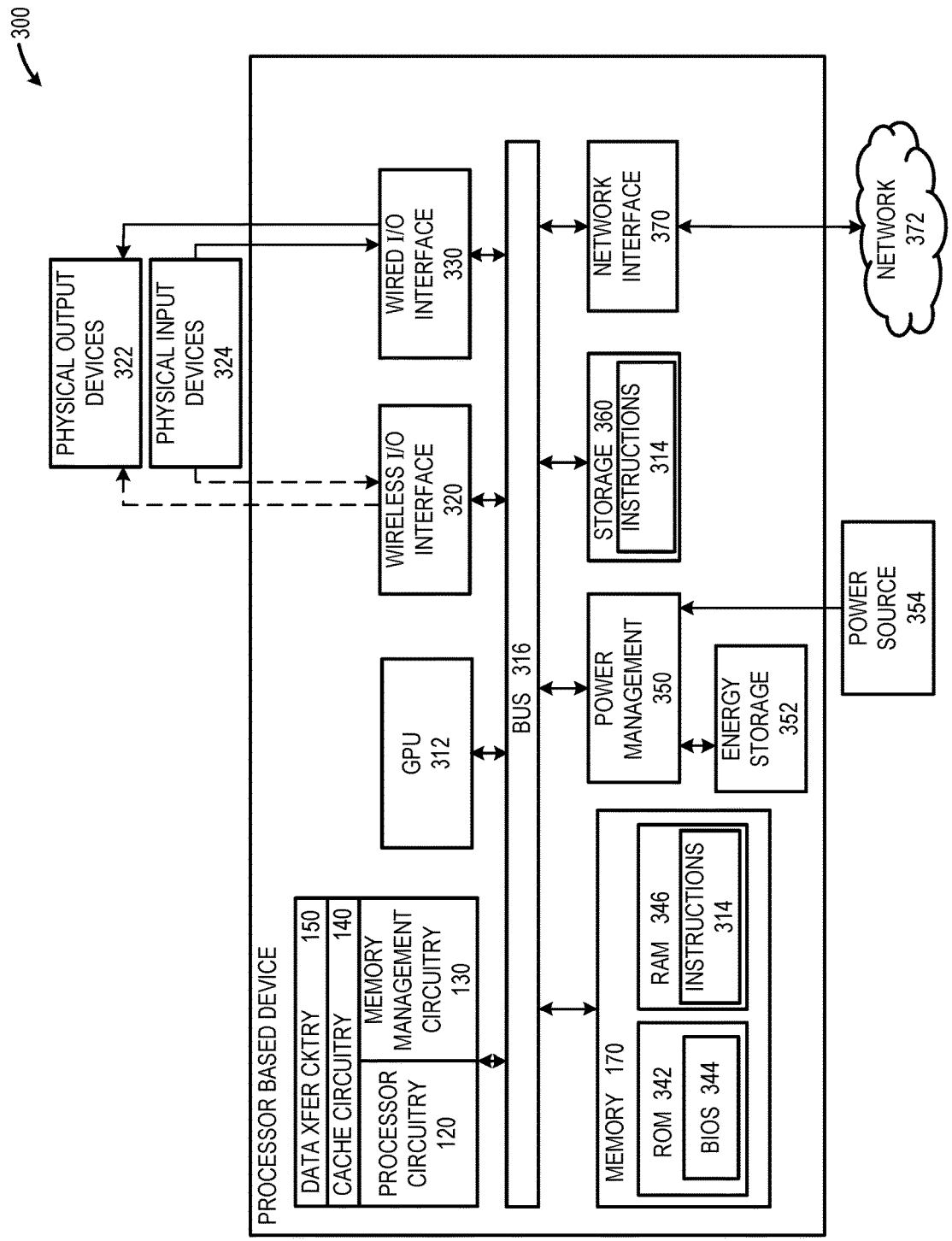
FIG. 3 is a schematic diagram of an illustrative electronic, processor-based, device that includes processor circuitry and memory management circuitry coupled to CPU cache circuitry and data transfer buffer circuitry as described in FIGS. 1 and 2A-2D, in accordance with at least one embodiment described herein.

FIG. 3 is a schematic diagram of an illustrative electronic, processor-based, device 300 that includes processor circuitry 120 and memory management circuitry 130 coupled to CPU cache circuitry 140 and data transfer buffer circuitry 150 as described in FIGS. 1 and 2A-2D, in accordance with at least one embodiment described herein. The processor-based device 300 may additionally include one or more of the following: a graphical processing unit 312, a wireless input/output (I/O) interface 320, a wired I/O interface 330, main memory 170, power management circuitry 350, the non-transitory storage device 360, and a network interface 370. The following discussion provides a brief, general description of the components forming the illustrative processor-based device 300. Example, non-limiting processor-based devices 300 may include, but are not limited to: smartphones, wearable computers, portable computing devices, handheld computing devices, desktop computing devices, blade server devices, workstations, and similar.

The processor-based device 300 includes processor circuitry 120 that executes machine-readable instructions 122. At least a portion of the instructions 122 may include data access requests for information and/or data stored in the cache circuitry 140 or main memory 170. In embodiments, when an instruction requests data access, the information and/or data will be retrieved from either the cache circuitry 140 or the main memory 170. The retrieved data 256 is written to the data transfer buffer circuitry 150 until the instruction 122 that initiated the data request is successfully completed and/or retired, at which time the received data may be written to a cache line in the cache memory 140. If the instruction 122 initiating the data access does not complete successfully or is unretired (e.g., generates an exception), the retrieved data 256 is not written to the cache circuitry 140. Thus, the use of the data transfer buffer circuitry 150 as a temporary "holding area" for data retrieved at the request of an unretired instruction 122 beneficially and advantageously minimizes or even eliminates the use of a cache timing attack, such as a Meltdown type side-channel attack, in surreptitiously obtaining information and/or data from protected memory locations within the main memory 170.

In some embodiments, the processor-based device 300 includes graphics processor circuitry 312 capable of executing machine-readable instruction sets 314 and generating an output signal capable of providing a display output to a system user. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like. The processor circuitry 120 may include any number of hardwired or configurable circuits, some or all of which may include programmable and/or configurable combinations of electronic components, semiconductor devices, and/or logic elements that are disposed partially or wholly in a PC, server, or other computing system capable of executing processor-readable instructions.

The processor-based device 300 includes a bus or similar communications link 316 that communicably couples and facilitates the exchange of information and/or data between various system components including the processor circuitry 120, the graphics processor circuitry 312, one or more wireless I/O interfaces 320, one or more wired I/O interfaces 330, one or more storage devices 360, and/or one or more network interfaces 370. The processor-based device 300 may be referred to in the singular herein, but this is not intended to limit the embodiments to a single processor-based device 300, since in certain embodiments, there may be more than one processor-based device 300 that incorporates, includes, or contains any number of communicably coupled, collocated, or remote networked circuits or devices.

The processor circuitry 120 may include any number, type, or combination of currently available or future developed devices capable of executing machine-readable instruction sets. The processor circuitry 120 may include but is not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 3 are of conventional design. Consequently, such blocks need not be described in further detail herein, as they will be understood by those skilled in the relevant art. The bus 316 that interconnects at least some of the components of the processor-based device 300 may employ any currently available or future developed serial or parallel bus structures or architectures.

The system memory 170 may include read-only memory ("ROM") 342 and random access memory ("RAM") 346. A portion of the ROM 342 may be used to store or otherwise retain a basic input/output system ("BIOS") 344. The BIOS 344 provides basic functionality to the processor-based device 300, for example by causing the processor circuitry 120 to load and/or execute one or more machine-readable instruction sets 314. In embodiments, at least some of the one or more machine-readable instruction sets 314 cause at least a portion of the processor circuitry 120 to provide, create, produce, transition, and/or function as a dedicated, specific, and particular machine, for example a word processing machine, a digital image acquisition machine, a media playing machine, a gaming system, a communications device, a smartphone, or similar.

The processor-based device 300 may include at least one wireless input/output (I/O) interface 320. The at least one wireless I/O interface 320 may be communicably coupled to one or more physical output devices 322 (tactile devices, video displays, audio output devices, hardcopy output devices, etc.). The at least one wireless I/O interface 320 may communicably couple to one or more physical input devices 324 (pointing devices, touchscreens, keyboards, tactile devices, etc.). The at least one wireless I/O interface 320 may include any currently available or future developed wireless I/O interface. Example wireless I/O interfaces include, but are not limited to: BLUETOOTH®, near field communication (NFC), and similar.

The processor-based device 300 may include one or more wired input/output (I/O) interfaces 430. The at least one wired I/O interface 330 may be communicably coupled to one or more physical output devices 322 (tactile devices, video displays, audio output devices, hardcopy output devices, etc.). The at least one wired I/O interface 330 may be communicably coupled to one or more physical input devices 324 (pointing devices, touchscreens, keyboards, tactile devices, etc.). The wired I/O interface 330 may include any currently available or future developed I/O interface. Example wired I/O interfaces include, but are not limited to: universal serial bus (USB), IEEE 1394 ("FireWire"), and similar.

The processor-based device 300 may include one or more communicably coupled, non-transitory, data storage devices 360. The data storage devices 360 may include one or more hard disk drives (HDDs) and/or one or more solid-state storage devices (SSDs). The one or more data storage devices 360 may include any current or future developed storage appliances, network storage devices, and/or systems. Non-limiting examples of such data storage devices 360 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 360 may include one or more removable storage devices, such as one or more flash drives, flash memories, flash storage units, or similar appliances or devices capable of communicable coupling to and decoupling from the processor-based device 300.

The one or more data storage devices 360 may include interfaces or controllers (not shown) communicatively coupling the respective storage device or system to the bus 316. The one or more data storage devices 360 may store, retain, or otherwise contain machine-readable instruction sets, data structures, program modules, data stores, databases, logical structures, and/or other data useful to the processor circuitry 12 and/or graphics processor circuitry 312 and/or one or more applications executed on or by the processor circuitry 120 and/or graphics processor circuitry 312. In some instances, one or more data storage devices 360 may be communicably coupled to the processor circuitry 120, for example via the bus 316 or via one or more wired communications interfaces 330 (e.g., Universal Serial Bus or USB); one or more wireless communications interfaces 320 (e.g., Bluetooth®, Near Field Communication or NFC); and/or one or more network interfaces 470 (IEEE 802.3 or Ethernet, IEEE 802.11, or WiFi®, etc.).

Processor-readable instruction sets 314 and other programs, applications, logic sets, and/or modules may be stored in whole or in part in the system memory 170. Such instruction sets 314 may be transferred, in whole or in part, from the one or more data storage devices 360. The instruction sets 314 may be loaded, stored, or otherwise retained in system memory 170, in whole or in part, during execution by the processor circuitry 120 and/or graphics processor circuitry 312. The processor-readable instruction sets 314 may include machine-readable and/or processor-readable code, instructions, or similar logic capable of causing the processor circuitry 120 and/or the memory management circuitry 130 to transfer data from the main memory 170 and/or cache circuitry 140 to a data transfer buffer circuitry 150. The instructions may further cause the retrieved data to remain in the data transfer buffer circuitry 150 until the instruction 122 initiating the data access is successfully completed and/or retired. The instructions may additionally cause the retrieved data to be written to the cache circuitry 140 upon successful completion and/or retirement of the instruction 122 initiating the data access. The instructions may additionally cause the retrieved data to be held in and eventually flushed from the data transfer buffer circuitry 150 upon unsuccessful completion and/or unretirement of the instruction 122 initiating the data access.

The processor-based device 300 may include power management circuitry 350 that controls one or more operational aspects of the energy storage device 352. In embodiments, the energy storage device 352 may include one or more primary (i.e., non-rechargeable) or secondary (i.e., rechargeable) batteries or similar energy storage devices. In embodiments, the energy storage device 352 may include one or more supercapacitors or ultracapacitors. In embodiments, the power management circuitry 350 may alter, adjust, or control the flow of energy from an external power source 354 to the energy storage device 352 and/or to the processor-based device 300. The power source 354 may include, but is not limited to, a solar power system, a commercial electric grid, a portable generator, an external energy storage device, or any combination thereof.

For convenience, the processor circuitry 120, the graphics processor circuitry 312, the wireless I/O interface 320, the wired I/O interface 330, the power management circuitry 350, the storage device 360, and the network interface 370 are illustrated as communicatively coupled to each other via the bus 316, thereby providing connectivity between the above-described components. In alternative embodiments, the above-described components may be communicatively coupled in a different manner than illustrated in FIG. 3. For example, one or more of the above-described components may be directly coupled to other components, or may be coupled to each other, via one or more intermediary components (not shown). In another example, one or more of the above-described components may be integrated into the processor circuitry 120, memory management circuitry 130, and/or the graphics processor circuitry 312. In some embodiments, all or a portion of the bus 316 may be omitted and the components are coupled directly to each other using suitable wired or wireless connections.

Figure 4:
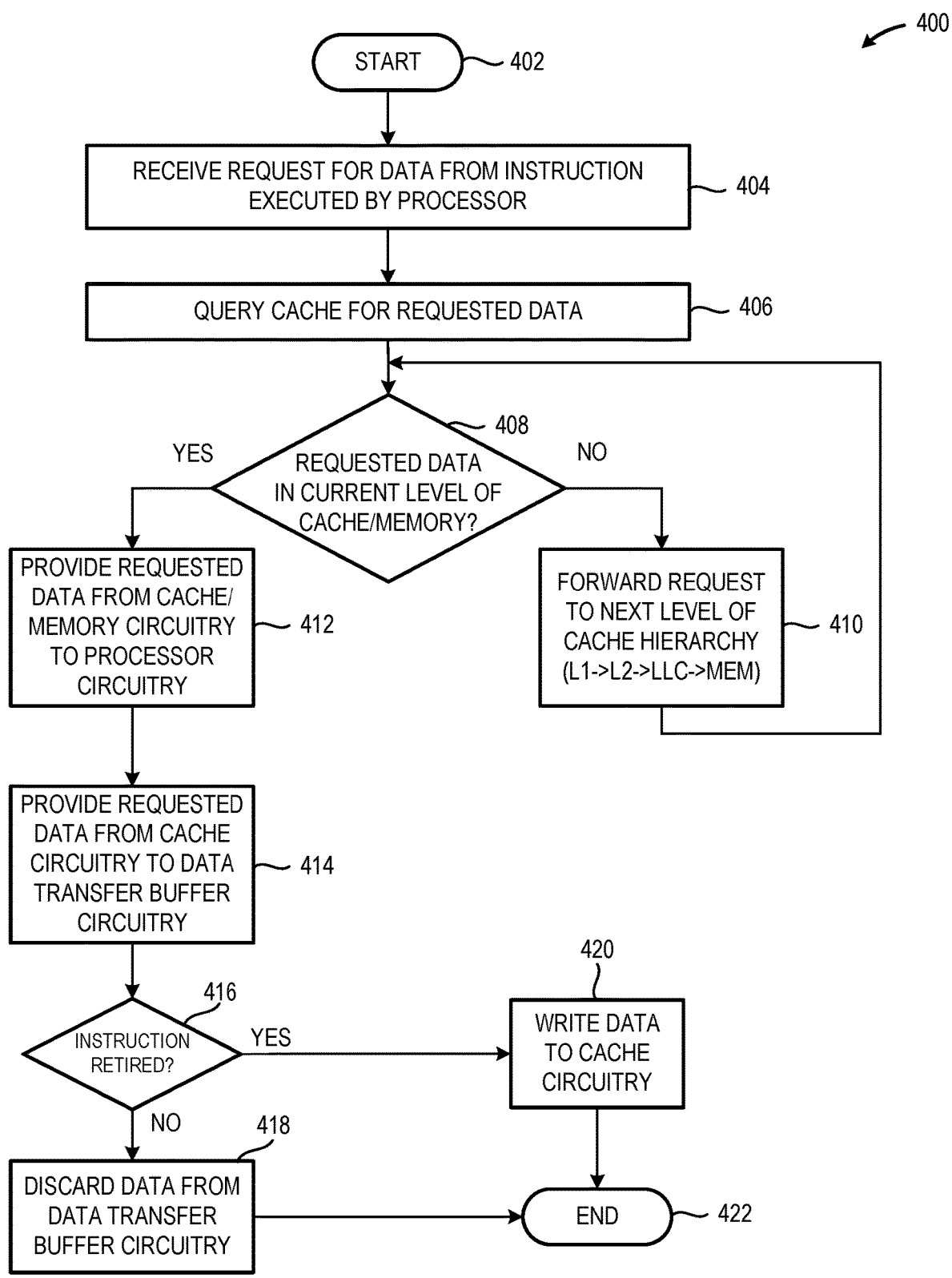
FIG. 4 is a high-level flow diagram of an illustrative method of impeding malicious observation of CPU cache operations, in accordance with at least one embodiment described herein.

FIG. 4 is a high-level flow diagram of an illustrative method 400 of impeding malicious observation of CPU cache operations, in accordance with at least one embodiment described herein. Side-channel cache timing attacks, such as a Meltdown side-channel attack, rely upon obtaining timing information from cache load operations to infer values associated with protected system memory. The method 400 beneficially and advantageously circumvents such side-channel timing attacks by creating a record 250 in the data transfer buffer circuitry 150 as a temporary holding point for data retrieved by one or more incomplete or unretired data access instructions 122A-122n. Each such record 250 generated by the memory management circuitry 130 includes placing data retrieved from system main memory into data transfer buffer circuitry 150 where the data is retained until the instruction causing the data access is successfully completed and/or retired. Only after retiring the one or more instructions responsible for the data access is the retrieved data loaded into cache circuitry 140. The method 400 commences at 402.

At 404, one or more instructions 122A-122n executed by the processor circuitry generate an access request for information and/or data. The information and/or data requested by the one or more instructions 122 may be disposed in either (or both) the cache circuitry 140 and/or the main memory 170. For example, the memory access instructions may include assigning a value to a variable read from memory (e.g., data=getByte(kernelAddress)), using the retrieved value as an index to write data to another memory location, such as an array (e.g., variable=probeArray(data)), or combinations thereof.

At 406, the memory management circuitry 130 queries the cache memory circuitry 140 to determine whether the requested data is stored or otherwise retained in the cache memory circuitry 140.

At 408, the memory management circuitry 130 determines whether the information and/or data accessed by the one or more instructions 122 are resident in the current level cache circuitry 140. The memory management circuitry 130 may determine whether the information and/or data accessed by the one or more instructions 122 are resident in one or more of: first level (L1) cache circuitry 242; second level (L2) cache circuitry 244; and/or last level cache circuitry 246. If the one or more instructions 122 access information and/or data that is not present in the current level cache disposed in the cache circuitry 140, the method 400 continues at 410 where each sequentially lower level of cache circuitry 140 and (as necessary) main memory 170 is searched until the information and/or data accessed by the instruction 122 is located and retrieved. If the one or more instructions 122 access information and/or data disposed in the current level of cache circuitry 140 or the main memory 170, the method 400 continues at 412.

At 412, responsive to the one or more instructions 122 accessing information and/or data disposed in the cache circuitry 140, the memory management circuitry 130 causes the requested information and/or data be transferred from the cache circuitry 140 to the processor circuitry 130.

At 414, responsive to the one or more instructions 122 accessing information and/or data disposed in the cache circuitry 140, the memory management circuitry 130 causes the requested information and/or data be transferred from the cache circuitry 140 to the data transfer buffer circuitry 150. The requested information and/or data may be stored as a record 250 in the data transfer buffer circuitry 150. Each record 250 includes but is not limited to: the 2- to 8-bit location field 252 that includes data indicative of the origin location of the accessed data (e.g., L1 cache/L2 cache/LLC cache/external location); the physical and/or virtual address 254 of the retrieved data 256; and one or more identifiers 124A-124n associated with the one or more instructions 122A-122n that initiated the data access request. In embodiments, the information and/or data accessed by the one or more instructions 122 may be stored or otherwise retained in the data transfer buffer circuitry 150 until the one or more instructions are successfully executed and/or retired.

At 416, the memory management circuitry 130 determines whether the one or more instructions 122 initiating the data access request have successfully completed and/or been retired. If the one or more instructions 122 initiating the data access request have successfully completed and/or been retired, the method 400 continues at 420 where the data and/or information requested by the one or more instructions are transferred to the cache circuitry 140 and the method 400 concludes at 422. If the one or more instructions 122 initiating the data access request have not successfully completed and/or remain unretired, the method 400 continues at 418 where the information and/or data accessed by the one or more instructions 122 and transferred into the data transfer buffer circuitry 150 is discarded. The method 400 concludes at 422.

While FIG. 4 illustrates various operations according to one or more embodiments, it is to be understood that not all of the operations depicted in FIG. 4 are necessary for other embodiments. Indeed, it is fully contemplated herein that in other embodiments of the present disclosure, the operations depicted in FIG. 4, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry or future computing paradigms including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more mediums (e.g., non-transitory storage mediums) having stored therein, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

Thus, the present disclosure is directed to systems and methods for preventing or mitigating the effects of a cache-timing based side channel attack, such as a Meltdown type attack. In response to a speculatively executed data access by an unretired or incomplete instruction, rather than transferring data to the CPU cache, the data is instead transferred to data transfer buffer circuitry where the data is held in the form of a record until the instruction requesting the data is successfully completed or retired. Upon retirement of the instruction requesting the data access, the data included in the record may be transferred to the CPU cache. Each record held in the data transfer buffer circuitry may include: a data source identifier; a physical/virtual address of the data; a cache line that includes the data; and an instruction identifier associated with the instruction initiating the data access.

The following examples pertain to further embodiments. The following examples of the present disclosure may comprise subject material such as at least one device, a method, at least one machine-readable medium for storing instructions that when executed cause a machine to perform acts based on the method, means for performing acts based on the method and/or a system for impeding malicious observation of CPU cache operations.

According to example 1, there is provided a system. The system may include: processor circuitry. The processor circuitry may include: cache circuitry; and data transfer buffer circuitry coupled to the cache circuitry. The system may additionally include: memory controller circuitry and a storage device containing instructions that, when executed by the memory controller circuitry, cause the memory controller circuitry to: receive a request for data by an instruction executed by the processor circuitry: determine whether the requested data is present in the cache circuitry; responsive to a determination that the requested data is present in the cache circuitry, cause a transfer of the requested data from a cache circuitry to the data transfer buffer circuitry; responsive to a determination that the requested data does is not included in the cache circuitry, cause a transfer of the requested data from a main memory location to a location in the data transfer buffer circuitry; and responsive to receipt of an indication of a successful execution of the instruction by the processor circuitry, transfer the requested data from the location in the data transfer buffer circuitry to a location in the cache circuitry.

Example 2 may include elements of example 1 where the instructions may further cause the memory controller circuitry to, responsive to a determination the requested data exists in the cache circuitry, cause a transfer of the data from the cache circuitry to the processor circuitry.

Example 3 may include elements of any of examples 1 or 2 where, responsive to a failure to receive the indication of the successful execution of the instruction by the processor circuitry, retain the requested data in the location in the data transfer buffer circuitry and do not transfer the requested data to the cache circuitry.

Example 4 may include elements of any of examples 1 through 3 where the instructions that cause the memory controller circuitry to transfer the requested data from the location in the data transfer buffer circuitry to a location in the cache circuitry, may cause the memory controller circuitry to: transfer the requested data from the location in the data transfer buffer circuitry to a location in the cache circuitry responsive to receipt of a data indicative that the instruction has been retired by the processor circuitry.

Example 5 may include elements of any of examples 1 through 4 where the cache circuitry comprises multi-level cache circuitry that may include: Level 1 (L1) Cache circuitry; Level 2 (L2) Cache circuitry; and Last Level Cache (LLC) memory circuitry.

Example 6 may include elements of any of examples 1 through 5 where the memory controller circuitry, responsive to a determination that the requested data does not exist in the L1 Cache circuitry, determines whether the requested data exists in the L2 Cache circuitry or the LLC Cache circuitry; and where the memory controller circuitry, responsive to a determination that the requested data exists in at least one of the L2 Cache circuitry or the LLC Cache circuitry, causes the transfer of the requested data to the processor circuitry.

Example 7 may include elements of any of examples 1 through 6 where the data transfer buffer circuitry includes a plurality of data records, each of the data records may include: a first data field to contain information indicative of an entity originating the data request; a second data field to contain information indicative of an address of the requested data; a third data field to contain the requested data; and a fourth data field to contain information indicative of an identifier associated with the instruction initiating the data request.

According to example 8, there is provided a method. The method may include: receiving, by memory controller circuitry, a request for data by an instruction executed by processor circuitry: determining, by the memory controller circuitry, whether the requested data is included in cache circuitry; causing a transfer of the requested data from a main memory location to a location in the data transfer buffer circuitry responsive to a determination that the requested data is not held in the cache circuitry; and causing a transfer of the requested data from the location in the data transfer buffer circuitry to a location in the cache circuitry responsive to receipt of an indication of a successful execution of the instruction by the processor circuitry.

Example 9 may include elements of example 8, and the method may additionally include: causing, by the memory controller circuitry, a transfer of the data from the cache circuitry to the processor circuitry responsive to a determination the requested data is held in the cache circuitry.

Example 10 may include elements of any of examples 8 or 9 and the method may additionally include: causing, by the memory controller circuitry, a retention of the requested data in the location in the data transfer buffer circuitry and do not transfer the requested data to the cache circuitry responsive to a failure to receive the indication of the successful execution of the instruction by the processor circuitry.

Example 11 may include elements of any of examples 8 through 10 where causing a transfer of the requested data from the location in the data transfer buffer circuitry to a location in the cache circuitry may include: receiving, by the memory controller circuitry, data indicative that the instruction executed by the processor circuitry has been retired; and causing, by the memory controller circuitry, a transfer of the requested data from the location in the data transfer buffer circuitry to a location in the cache circuitry responsive to receipt of the data indicative that the instruction executed by the processor circuitry has been retired.

Example 12 may include elements of any of examples 8 through 11 where causing, by the memory controller circuitry, a transfer of the requested data from the location in the data transfer buffer circuitry to a location in the cache circuitry may include: causing, by the memory controller circuitry, a transfer of the requested data from the location in the data transfer buffer circuitry to a location in at least one of: Level 1 (L1) Cache circuitry; Level 2 (L2) Cache circuitry; and Last Level Cache (LLC) memory circuitry.

Example 13 may include elements of any of examples 8 through 12 where determining whether the requested data is included in cache circuitry may further include: determining, by the memory controller circuitry, whether the requested data is included in the L1 cache circuitry; determining, by the memory controller circuitry, whether responsive to a determination that the requested data does not exist in the L1 Cache circuitry, determines whether the requested data exists in the L2 Cache circuitry or the LLC Cache circuitry; and causing, by the memory controller circuitry, a transfer of the requested data from at least one of the L2 Cache circuitry or the LLC Cache circuitry to the processor circuitry responsive to a determination that the requested data exists in at least one of the L2 Cache circuitry or the LLC Cache circuitry.

Example 14 may include elements of any of examples 8 through 13 where causing a transfer of the requested data from a main memory location to a location in the data transfer buffer circuitry may further include: causing, by the memory controller circuitry, a transfer of the requested data from a main memory location to a location in data transfer buffer circuitry that includes a plurality of data records, each of the data records including: a first data field to contain information indicative of an entity originating the data request; a second data field to contain information indicative of an address of the requested data; a third data field to contain the requested data; and a fourth data field to contain information indicative of an identifier associated with the instruction causing the data request.

According to example 15, there is provided a system. The system may include: means for receiving a request for data by an instruction executed by processor circuitry; means for determining whether the requested data is included in cache circuitry; means for causing a transfer of the requested data from a main memory location to a location in the data transfer buffer circuitry responsive to a determination that the requested data is not held in the cache circuitry; and means for causing a transfer of the requested data from the location in the data transfer buffer circuitry to a location in the cache circuitry responsive to receipt of an indication of a successful execution of the instruction by the processor circuitry.

Example 16 may include elements of example 15 and the system may further include: means for causing a transfer of the data from the cache circuitry to the processor circuitry responsive to a determination the requested data is held in the cache circuitry.

Example 17 may include elements of any of examples 15 or 16 and the system may further include: means for causing a retention of the requested data in the location in the data transfer buffer circuitry and do not transfer the requested data to the cache circuitry responsive to a failure to receive the indication of the successful execution of the instruction by the processor circuitry.

Example 18 may include elements of any of examples 15 through 17 where the means for causing a transfer of the requested data from the location in the data transfer buffer circuitry to a location in the cache circuitry may include: means for receiving, by the memory controller circuitry, data indicative that the instruction executed by the processor circuitry has been retired; and means for causing a transfer of the requested data from the location in the data transfer buffer circuitry to a location in the cache circuitry responsive to receipt of the data indicative that the instruction executed by the processor circuitry has been retired.

Example 19 may include elements of any of examples 15 through 18 where the means for causing a transfer of the requested data from the location in the data transfer buffer circuitry to a location in the cache circuitry may include: means for causing a transfer of the requested data from the location in the data transfer buffer circuitry to a location in at least one of: Level 1 (L1) Cache circuitry; Level 2 (L2) Cache circuitry; and Last Level Cache (LLC) memory circuitry.

Example 20 may include elements of any of examples 15 through 19 where the means for determining whether the requested data is included in cache circuitry may further include: means for determining whether the requested data is included in the L1 cache circuitry; means for determining whether responsive to a determination that the requested data does not exist in the L1 Cache circuitry, determines whether the requested data exists in the L2 Cache circuitry or the LLC Cache circuitry; and means for causing a transfer of the requested data from at least one of the L2 Cache circuitry or the LLC Cache circuitry to the processor circuitry responsive to a determination that the requested data exists in at least one of the L2 Cache circuitry or the LLC Cache circuitry.

Example 21 may include elements of any of examples 15 through 20 where the means for causing a transfer of the requested data from a main memory location to a location in the data transfer buffer circuitry may further include: means for causing a transfer of the requested data from a main memory location to a location in data transfer buffer circuitry that includes a plurality of data records, each of the data records including: a first data field to contain information indicative of an entity originating the data request; a second data field to contain information indicative of an address of the requested data; a third data field to contain the requested data; and a fourth data field to contain information indicative of an identifier associated with the instruction causing the data request.

According to example 22, there is provided a non-transitory machine-readable storage medium. The non-transitory machine-readable storage medium may include instructions that, when executed by memory controller circuitry, cause the memory controller circuitry to: receive a request for data by an instruction executed by processor circuitry: determine whether the requested data is included in cache circuitry; cause a transfer of the requested data from a main memory location to a location in the data transfer buffer circuitry responsive to a determination that the requested data is not held in the cache circuitry; and cause a transfer of the requested data from the location in the data transfer buffer circuitry to a location in the cache circuitry responsive to receipt of an indication of a successful execution of the instruction by the processor circuitry.

Example 23 may include elements of example 22 where the instructions may further cause the memory controller circuitry to: cause a transfer of the data from the cache circuitry to the processor circuitry responsive to a determination the requested data is held in the cache circuitry.

Example 24 may include elements of any of examples 22 or 23 where the instructions may further cause the memory controller circuitry to: cause a retention of the requested data in the location in the data transfer buffer circuitry and do not transfer the requested data to the cache circuitry responsive to a failure to receive the indication of the successful execution of the instruction by the processor circuitry.

Example 25 may include elements of any of examples 22 through 24 where the instructions that cause the memory controller circuitry to cause a transfer of the requested data from the location in the data transfer buffer circuitry to a location in the cache circuitry may further cause the memory controller circuitry to: receive data indicative that the instruction executed by the processor circuitry has been retired; and cause a transfer of the requested data from the location in the data transfer buffer circuitry to a location in the cache circuitry responsive to receipt of the data indicative that the instruction executed by the processor circuitry has been retired.

Example 26 may include elements of any of examples 22 through 25 where the instructions that cause the memory controller circuitry to cause a transfer of the requested data from the location in the data transfer buffer circuitry to a location in the cache circuitry may further cause the memory controller circuitry to: cause a transfer of the requested data from the location in the data transfer buffer circuitry to a location in at least one of: Level 1 (L1) Cache circuitry; Level 2 (L2) Cache circuitry; and Last Level Cache (LLC) memory circuitry.

Example 27 may include elements of any of examples 22 through 26 where the instructions that cause the memory controller circuitry to determine whether the requested data is included in cache circuitry may further cause the memory controller circuitry to: determine whether the requested data is included in the L1 cache circuitry; determine whether responsive to a determination that the requested data does not exist in the L1 Cache circuitry, determines whether the requested data exists in the L2 Cache circuitry or the LLC Cache circuitry; and cause a transfer of the requested data from at least one of the L2 Cache circuitry or the LLC Cache circuitry to the processor circuitry responsive to a determination that the requested data exists in at least one of the L2 Cache circuitry or the LLC Cache circuitry.

Example 28 may include elements of any of examples 22 through 27 where the instructions that cause the memory controller circuitry to cause a transfer of the requested data from a main memory location to a location in the data transfer buffer circuitry may further cause the memory controller circuitry to: cause a transfer of the requested data from a main memory location to a location in data transfer buffer circuitry that includes a plurality of data records, each of the data records including: a first data field to contain information indicative of an entity originating the data request; a second data field to contain information indicative of an address of the requested data; a third data field to contain the requested data; and a fourth data field to contain information indicative of an identifier associated with the instruction causing the data request.

According to example 29, there is provided an electronic device. The electronic device may include: a printed circuit board; processor circuitry coupled to the printed circuit board, the processor circuitry including: cache circuitry; and data transfer buffer circuitry coupled to the cache circuitry; memory controller circuitry; main memory; and a storage device containing instructions that, when executed by the memory controller circuitry, cause the memory controller circuitry to: receive a request for data by an instruction executed by the processor circuitry: responsive to a determination that the requested data does is not included in the cache circuitry, cause a transfer of the requested data from a location in the main memory to a location in the data transfer buffer circuitry; and responsive to receipt of an indication of a successful execution of the instruction by the processor circuitry, transfer the requested data from the location in the data transfer buffer circuitry to a location in the cache circuitry.

Example 30 may include elements of example 29 where the instructions may further cause the memory controller circuitry to, responsive to a determination the requested data exists in the cache circuitry, cause a transfer of the data from the cache circuitry to the processor circuitry.

Example 31 may include elements of any of examples 29 or 30 where, responsive to a failure to receive the indication of the successful execution of the instruction by the processor circuitry, retain the requested data in the location in the data transfer buffer circuitry and do not transfer the requested data to the cache circuitry.

Example 32 may include elements of any of examples 29 through 31 where the instructions that cause the memory controller circuitry to transfer the requested data from the location in the data transfer buffer circuitry to a location in the cache circuitry, may cause the memory controller circuitry to: transfer the requested data from the location in the data transfer buffer circuitry to a location in the cache circuitry responsive to receipt of a data indicative that the instruction has been retired by the processor circuitry.

Example 33 may include elements of any of examples 29 through 32 where the cache circuitry comprises multi-level cache circuitry that may include one or more of: Level 1 (L1) Cache circuitry; Level 2 (L2) Cache circuitry; and Last Level Cache (LLC) memory circuitry.

Example 34 may include elements of any of examples 29 through 33 where the memory controller circuitry, responsive to a determination that the requested data does not exist in the L1 Cache circuitry, determines whether the requested data exists in the L2 Cache circuitry or the LLC Cache circuitry; and where the memory controller circuitry, responsive to a determination that the requested data exists in at least one of the L2 Cache circuitry or the LLC Cache circuitry, causes the transfer of the requested data to the processor circuitry.

Example 35 may include elements of any of examples 29 through 34 where the data transfer buffer circuitry includes a plurality of data records, each of the data records including: a first data field to contain information indicative of an entity originating the data request; a second data field to contain information indicative of an address of the requested data; a third data field to contain the requested data; and a fourth data field to contain information indicative of an identifier associated with the instruction causing the data request.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

What is claimed:

1. A system, comprising:
   processor circuitry, the processor circuitry including:
      cache circuitry; and
      data transfer buffer circuitry coupled to the cache circuitry;
   memory controller circuitry;
   a storage device containing instructions that, when executed by the memory controller circuitry, cause the memory controller circuitry to:
      receive a request for data by an instruction executed by the processor circuitry;
      determine whether the requested data is present in the cache circuitry;
      responsive to a determination that the requested data is present in the cache circuitry, cause a transfer of the requested data from a cache circuitry to the data transfer buffer circuitry;
      responsive to a determination that the requested data is not present in the cache circuitry, cause a transfer of the requested data from a main memory to the data transfer buffer circuitry; and
      responsive to receipt of an indication of a successful execution of the instruction by the processor circuitry, transfer the requested data from the data transfer buffer circuitry to the cache circuitry.

2. The system of claim 1 wherein the instructions further cause the memory controller circuitry to:
   responsive to a determination the requested data is present in the cache circuitry, cause a transfer of the data from the cache circuitry to the processor circuitry.

3. The system of claim 1 wherein, responsive to a failure to receive the indication of the successful execution of the instruction by the processor circuitry, discard the requested data from the data transfer buffer circuitry.

4. The system of claim 1 wherein the instructions that cause the memory controller circuitry to transfer the requested data from the data transfer buffer circuitry to the cache circuitry cause the memory controller circuitry to:
   transfer the requested data from the data transfer buffer circuitry to the cache circuitry responsive to receipt of a data indicative that the instruction has been retired by the processor circuitry.

5. The system of claim 1 wherein the cache circuitry comprises multi-level cache circuitry that includes:
   Level 1 (L1) cache circuitry;
   Level 2 (L2) cache circuitry; and
   Last Level Cache (LLC) circuitry.

6. The system of claim 5:
   wherein the memory controller circuitry, responsive to a determination that the requested is not present in the L1 cache circuitry, determines whether the requested data exists in the L2 cache circuitry or the LLC circuitry; and
   wherein the memory controller circuitry, responsive to a determination that the requested data is present in at least one of the L2 cache circuitry or the LLC circuitry, causes the transfer of the requested data to the processor circuitry.

7. The system of claim 1 wherein the data transfer buffer circuitry includes a plurality of data records, each of the data records including:
   a first data field to contain information indicative of an entity originating the data request;
   a second data field to contain information indicative of an address of the requested data;
   a third data field to contain the requested data; and
   a fourth data field to contain information indicative of an identifier associated with the instruction causing the data request.

8. A method, comprising:
   receiving, by memory controller circuitry, a request for data by an instruction executed by processor circuitry:
   determining, by the memory controller circuitry, whether the requested data is present in cache circuitry;
   causing, by the memory controller circuitry, a transfer of the requested data from the cache circuitry to a data transfer buffer circuitry responsive to a determination that the requested data is present in the cache circuitry;
   causing a transfer of the requested data from a main memory to the data transfer buffer circuitry responsive to a determination that the requested data is not present in the cache circuitry; and
   causing a transfer of the requested data from the data transfer buffer circuitry to the cache circuitry responsive to receipt of an indication of a successful execution of the instruction by the processor circuitry.

9. The method of claim 8, further comprising:
   causing, by the memory controller circuitry, a transfer of the data from the cache circuitry to the processor circuitry responsive to a determination the requested data is present in the cache circuitry.

10. The method of claim 8, further comprising:
causing, by the memory controller circuitry, a retention of the requested data in the data transfer buffer circuitry responsive to a failure to receive the indication of the successful execution of the instruction by the processor circuitry.

11. The method of claim 8 wherein causing a transfer of the requested data from the data transfer buffer circuitry to the cache circuitry comprises:
receiving, by the memory controller circuitry, data indicative that the instruction executed by the processor circuitry has been retired; and
causing, by the memory controller circuitry, a transfer of the requested data from the data transfer buffer circuitry to the cache circuitry responsive to receipt of the data indicative that the instruction executed by the processor circuitry has been retired.

12. The method of claim 11 wherein causing, by the memory controller circuitry, a transfer of the requested data from the data transfer buffer circuitry to the cache circuitry comprises:
causing, by the memory controller circuitry, a transfer of the requested data from the data transfer buffer circuitry to at least one of: Level 1 (L1) cache circuitry; Level 2 (L2) cache circuitry; and Last Level Cache (LLC) circuitry.

13. The method of claim 12 wherein determining whether the requested data is present in the cache circuitry further comprises:
determining, by the memory controller circuitry, whether the requested data is present in the L1 cache circuitry;
determining, by the memory controller circuitry, whether the requested data is present in the L2 Cache circuitry or the LLC circuitry responsive to a determination that the requested data is not present in the L1 Cache circuitry; and
causing, by the memory controller circuitry, a transfer of the requested data from at least one of the L2 cache circuitry or the LLC circuitry to the processor circuitry responsive to a determination that the requested data exists in at least one of the L2 cache circuitry or the LLC circuitry.

14. The method of claim 8 wherein causing a transfer of the requested data from the main memory to the data transfer buffer circuitry further comprises:
causing, by the memory controller circuitry, a transfer of the requested data from the main memory to the data transfer buffer circuitry, wherein the data transfer buffer circuitry includes a plurality of data records, each of the data records including:
a first data field to contain information indicative of an entity originating the data request;
a second data field to contain information indicative of an address of the requested data;
a third data field to contain the requested data; and
a fourth data field to contain information indicative of an identifier associated with the instruction causing the data request.

15. A system, comprising:
means for receiving a request for data by an instruction executed by processor circuitry:
means for determining whether the requested data is present in cache circuitry;
means for causing a transfer of the requested data from the cache circuitry to a data transfer buffer circuitry responsive to a determination that the requested data is present in the cache circuitry;
means for causing a transfer of the requested data from main memory to the data transfer buffer circuitry responsive to a determination that the requested data is not present in the cache circuitry; and
means for causing a transfer of the requested data from the data transfer buffer circuitry to the cache circuitry responsive to receipt of an indication of a successful execution of the instruction by the processor circuitry.

16. The system of claim 15, further comprising:
means for transferring of the data from the cache circuitry to the processor circuitry responsive to a determination the requested data is present in the cache circuitry.

17. The system of claim 15, further comprising:
means for retaining the requested data in the location in the data transfer buffer circuitry responsive to a failure to receive the indication of the successful execution of the instruction by the processor circuitry.

18. The system of claim 15 wherein the means for transferring the requested data from the data transfer buffer circuitry to the cache circuitry comprises:
means for receiving, by the memory controller circuitry, data indicative that the instruction executed by the processor circuitry has been retired; and
means for transferring of the requested data from the location in the data transfer buffer circuitry to a location in the cache circuitry responsive to receipt of the data indicative that the instruction executed by the processor circuitry has been retired.

19. The system of claim 18 wherein the means for transferring the requested data from the data transfer buffer circuitry to the cache circuitry comprises:
means for transferring the requested data from the location in the data transfer buffer circuitry to at least one of: Level 1 (L1) cache circuitry; Level 2 (L2) cache circuitry; and Last Level Cache (LLC) circuitry.

20. The system of claim 19 wherein the means for determining whether the requested data is present in the cache circuitry further comprises:
means for determining whether the requested data is present in the L1 cache circuitry;
means for determining whether the requested data is present in the L2 cache circuitry or the LLC circuitry responsive to a determination that the requested data is not present in the L1 cache circuitry; and
means for transferring the requested data from at least one of the L2 cache circuitry or the LLC circuitry to the processor circuitry responsive to a determination that the requested data is present in at least one of the L2 cache circuitry or the LLC circuitry.

21. The system of claim 15 wherein the means for transferring the requested data from the main memory to the data transfer buffer circuitry further comprises:
means for transferring the requested data from the main memory to the data transfer buffer circuitry, wherein the data transfer buffer circuitry includes a plurality of data records, each of the data records including:
a first data field to contain information indicative of an entity originating the data request;
a second data field to contain information indicative of an address of the requested data;
a third data field to contain the requested data; and
a fourth data field to contain information indicative of an identifier associated with the instruction causing the data request.

22. A non-transitory machine-readable storage medium containing instructions that, when executed by memory controller circuitry, cause the memory controller circuitry to:

receive a request for data from an instruction executed by processor circuitry;
determine whether the requested data is present in cache circuitry;
cause a transfer of the requested data from the cache circuitry to a data transfer buffer circuitry responsive to a determination that the requested data is present in the cache circuitry;
cause a transfer of the requested data from a main memory to the data transfer buffer circuitry responsive to a determination that the requested data is not present in the cache circuitry; and
cause a transfer of the requested data from the data transfer buffer circuitry to the cache circuitry responsive to receipt of an indication of a successful execution of the instruction by the processor circuitry.

23. The non-transitory machine-readable storage medium of claim 22 wherein the instructions cause the memory controller circuitry to:
cause a transfer of the data from the cache circuitry to the processor circuitry responsive to a determination the requested data is present in the cache circuitry.

24. The non-transitory machine-readable storage medium of claim 22 wherein the instructions cause the memory controller circuitry to:
cause a retention of the requested data in the data transfer buffer circuitry responsive to a failure to receive the indication of the successful execution of the instruction by the processor circuitry.

25. The non-transitory machine-readable storage medium of claim 22 wherein the instructions that cause a transfer of the requested data from the data transfer buffer circuitry to the cache circuitry cause the memory controller circuitry to:
receive data indicative that the instruction executed by the processor circuitry has been retired; and
cause a transfer of the requested data from the data transfer buffer circuitry to the cache circuitry responsive to receipt of the data indicative that the instruction executed by the processor circuitry has been retired.

26. The non-transitory machine-readable storage medium of claim 25 wherein the instructions that cause a transfer of the requested data from the data transfer buffer circuitry to the cache circuitry cause the memory controller circuitry to:
cause a transfer of the requested data from the data transfer buffer circuitry to at least one of: Level 1 (L1) cache circuitry; Level 2 (L2) cache circuitry; and Last Level Cache (LLC) circuitry.

27. The non-transitory machine-readable storage medium of claim 26 wherein the instructions that determine whether the requested data is present in the cache circuitry cause the memory controller circuitry to:
determine whether the requested data is present in the L1 cache circuitry;
determine whether the requested data is present in the L2 cache circuitry or the LLC circuitry responsive to a determination that the requested data is not present in the L1 cache circuitry; and
cause a transfer of the requested data from at least one of the L2 cache circuitry or the LLC circuitry to the processor circuitry responsive to a determination that the requested data is present in at least one of the L2 cache circuitry or the LLC circuitry.

* * * * *